United States Patent [19]

Hasley et al.

[11] Patent Number: 4,694,196

[45] Date of Patent: Sep. 15, 1987

[54] CLOCK RECOVERY CIRCUIT

[75] Inventors: Lloyd A. Hasley, Carrollton, Tex.; Jaan Raamot, Broomfield, Colo.

[73] Assignee: American Telephone and Telegraph Company and AT&T Information Systems, Holmdel, N.J.

[21] Appl. No.: 679,458

[22] Filed: Dec. 7, 1984

[51] Int. Cl.$^4$ ............................ H03L 7/06; H03K 1/17
[52] U.S. Cl. ....................................... 307/269; 328/63; 328/109; 307/480; 307/527
[58] Field of Search .................. 328/63, 72, 109, 133; 307/479, 480, 527, 528, 511, 518, 269, 262

[56] References Cited

U.S. PATENT DOCUMENTS 4,222,009  9/1980  Moulton et al. ..................... 328/75
4,227,251  10/1980  Kazama et al. ..................... 375/110
4,385,395  5/1983  Tanaka et al. ..................... 375/110

OTHER PUBLICATIONS

"For Data-Comm Links, Manchester Chip Could be Best", *Electronic Design*, Lester Sanders, Aug., 5, 1982, pp. 201-209.

Primary Examiner—Stanley D. Miller
Assistant Examiner—Richard Roseen
Attorney, Agent, or Firm—Donald M. Duft

[57]  ABSTRACT

A clock recovery circuit for recovering the clock from an incoming data stream. The circuit comprises a transition detector and a module 3 counter operating at three times the expected rate of the incoming clock. A clock pulse is generated by the counter one count interval after a transition is detected.

2 Claims, 8 Drawing Figures

FIG. 3
WAVE FORMS DATA RESTORATION AND CLOCK RECOVERY
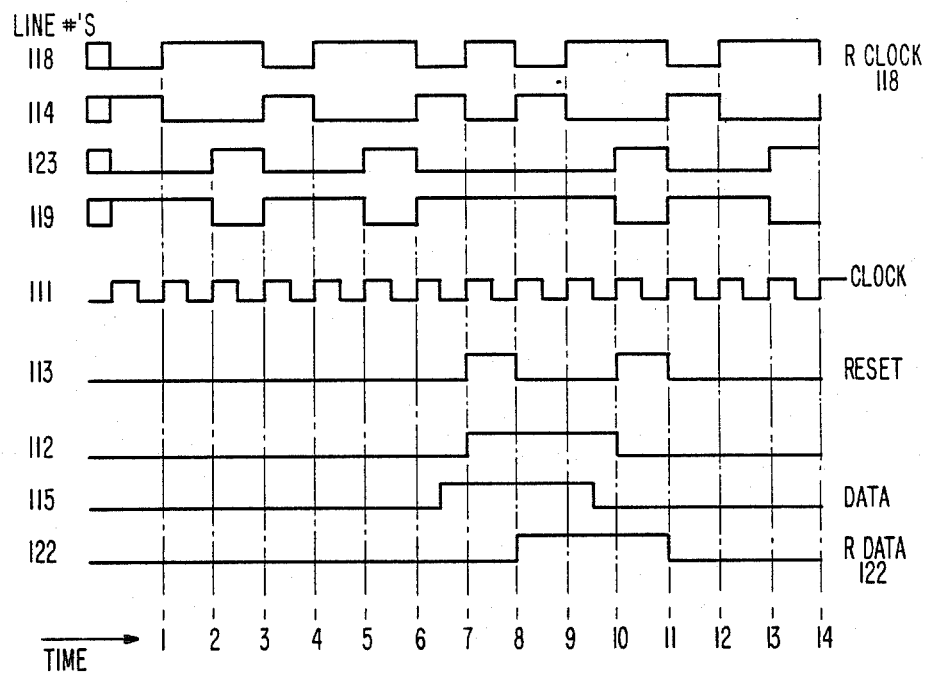
FIG. 4  COUNTER WAVEFORMS
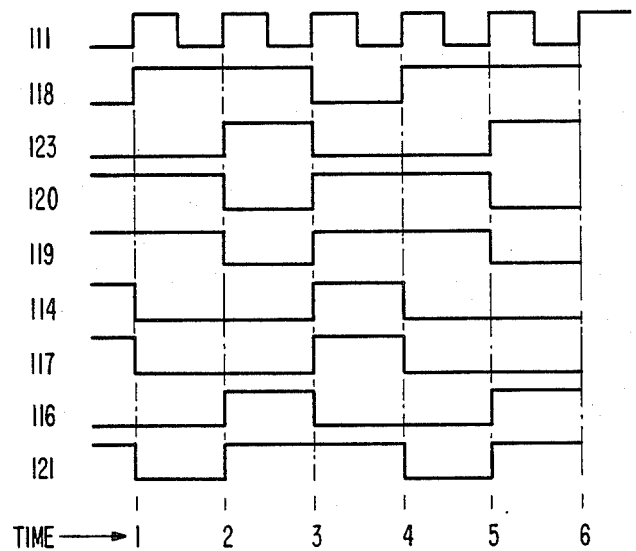

BEFORE t1 COUNT = 00 t1 - t2
t4 - t5 COUNT = 01 t2-t3
t5-t6  COUNT=11 t3-t4  COUNT=00

CLOCK RECOVERY CIRCUIT

TECHNICAL FIELD

This invention relates to a clock recovery circuit and, in particular, to a circuit for recovering the clock of a data source from a data stream transmitted from the source to a data receiving location.

BACKGROUND OF THE INVENTION

It is a requirement of data transmission systems that the circuitry of a location that receives data be synchronized with the clock of the source from which the data is transmitted. This is necessary so that the receiving location can regenerate data that corresponds to that which was transmitted.

An obvious way to synchronize a data receiver with a data transmitter is to apply a synchronizing signal over a separate path extending between the transmitter and the receiver. This expedient is satisfactory when the two locations are proximate each other, such as in the same equipment room. However, it is not normally economically feasible to provide a separate synchronizing path when the two locations are remote from one another.

It is known to provide circuits that recover the clock of a data source from the signal transmitted by the source to a receiving location. This expedient obviates the need for a separate synchronizing path. However, it does so at the cost of added clock recovery circuitry.

Thus, it is known to recover the clock from teletypewriter signals transmitted over a line in a serial RS232 format at a relatively low rate of 30 characters per second. These clock recovery circuits detect many samples (often 16) of each received bit and store the samples in a shift register. The shift register is read out in parallel and the output applied to an evaluation circuit which uses the principle of majority rule to determine whether the 16 samples represent a binary "0" or a binary "1". Circuitry of this type is commonly used in UARTs (universal asynchronous receivers/transmitters). UART circuits are not fast, but speed is not important since the data rate is often only 30 characters per second. Also, signals received over teletypewriter lines are often noisy. However, the sampling rate of 16 times the incoming clock rate tends to minimize bit errors due to noise.

An improved clock recovery circuit is disclosed in an article entitled "For data-com links, Manchester chip could be best" by Lester Sanders shown on pages 201 through 209 of *Electronic Design* of Aug. 5, 1982. This circuit is embodied in LSI and uses 12 samples of each received bit in the incoming data stream to derive clock signals. The 12 samples are stored in a shift register which is read out in parallel to derive the incoming clock in much the same manner as in UART devices.

The above-described circuits operate satisfactory to derive the clock of incoming data. However, the sampling rate of 12 or 16 times the incoming clock limits the incoming clock frequency at which these circuits can operate. These circuits also have the disadvantage that a steady incoming stream of "0's" produces no clock at all since these circuits are waveform transition driven.

SUMMARY OF THE INVENTION

We provide an improved circuit for deriving the clock of a received data signal. Our circuit comprises an incoming waveform transition detector and a modulo-3 counter having states of 00, 01, and 11. It is normally free running under control of a local crystal clock having a nominal frequency three times that of the expected incoming clock rate. The counter repetitively cycles through its three states under control of the local crystal clock when no incoming data is received. The transition detector produces a counter reset pulse to reset the counter to its position 00 in response to each transition of the incoming data from a "0" to a "1" or vice versa. Once reset, the counter immediately begins to count through its positions 00, 01, 11, 00 --- in response to the local clock pulses.

A derived clock pulse is generated each time the counter advances from its position 00 to 01. Each derived clock pulse is generated at a time that is in the middle of any received data bit that is then being received. The application to a data utilization device of the derived clock pulse and a sample signal representing an incoming bit ensures that the sample is a faithful duplication of the incoming signal and is free from edge distortion and transients.

Our invention is further advantageous in that it can accommodate data of higher clock rates than the prior art arrangements. This results from the fact that our sampling rate is only three times, rather than 12 or 16 times, that of the incoming clock rate.

BRIEF DESCRIPTION OF THE DRAWING

FIGS. 2, 3, and 4 are timing diagrams; and

GENERAL DESCRIPTION

Figure 1:
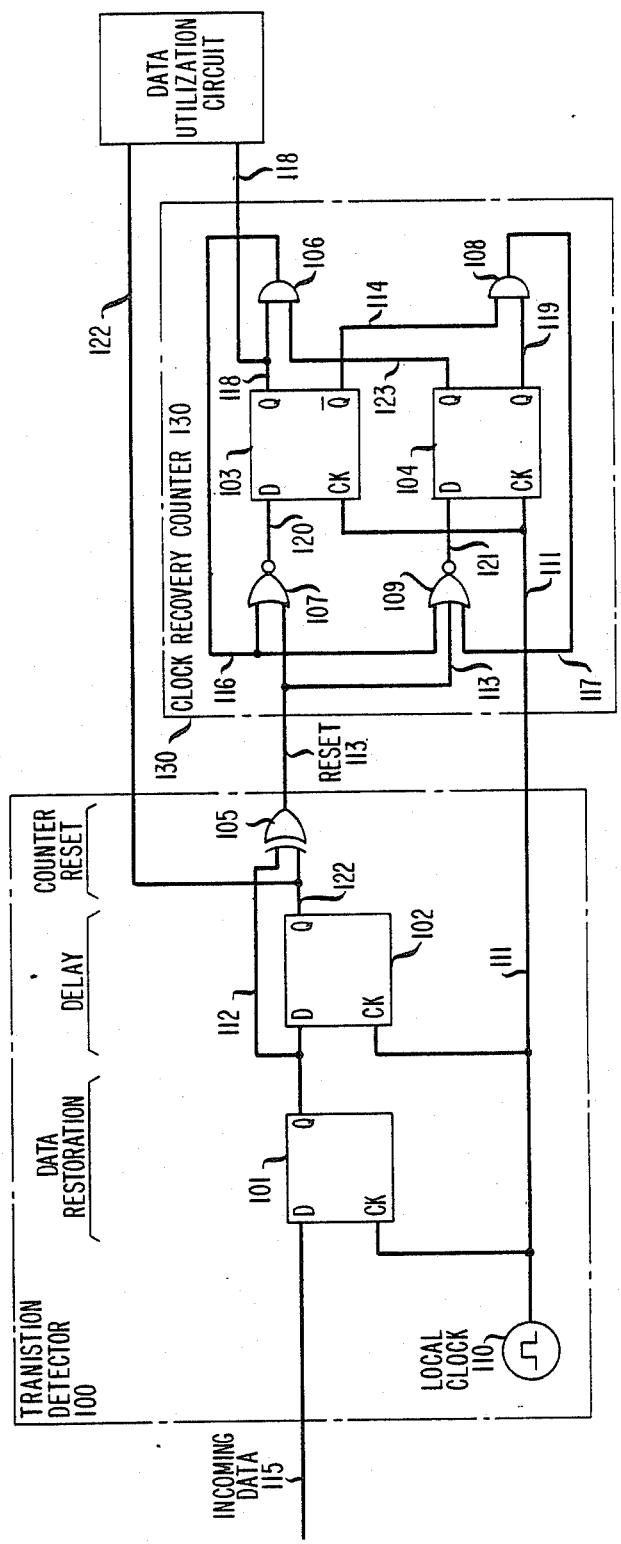
FIG. 1 discloses the circuit details of one possible exemplary embodiment of my invention.

The circuit of our invention is shown on FIG. 1 to comprise a transition detector 100, a clock recovery counter 130, local clock 110 and a data utilization device 140. Input data whose clock is to be derived is received on path 115 and applied to detector 100. The received data is extended through latches 101 and 102 and over applied path 122 to utilization device 140. The detector 100 applies a counter reset pulse to path 113 in response to each transition of the incoming data on path 115 from a "0" to a "1" and vice versa.

Counter 130 is driven over path 111 by local clock 110 at three times the expected rate of the incoming clock signals on data path 115. The counter is of the modulo-3 type and generates a derived clock signal on path 118 each time it advances from its 00 (reset) state to its 01 state. Each pulse generated on path 113 always resets the counter to its position 00. The counter is in nominal synchronization with the incoming signal and should usually be in its position 11 from the local clock 110 when the reset pulse is received on path 113.

Thus, a reset pulse is generated on path 113 to reset the counter 130 to its position 00 for each transition of the incoming signal on path 115. The counter generates a derived clock pulse when its steps from its position 00 to its position 01. Data utilization circuit 140 samples the data on path 122 only when it receives a derived clock pulse on path 118.

Figure 2:
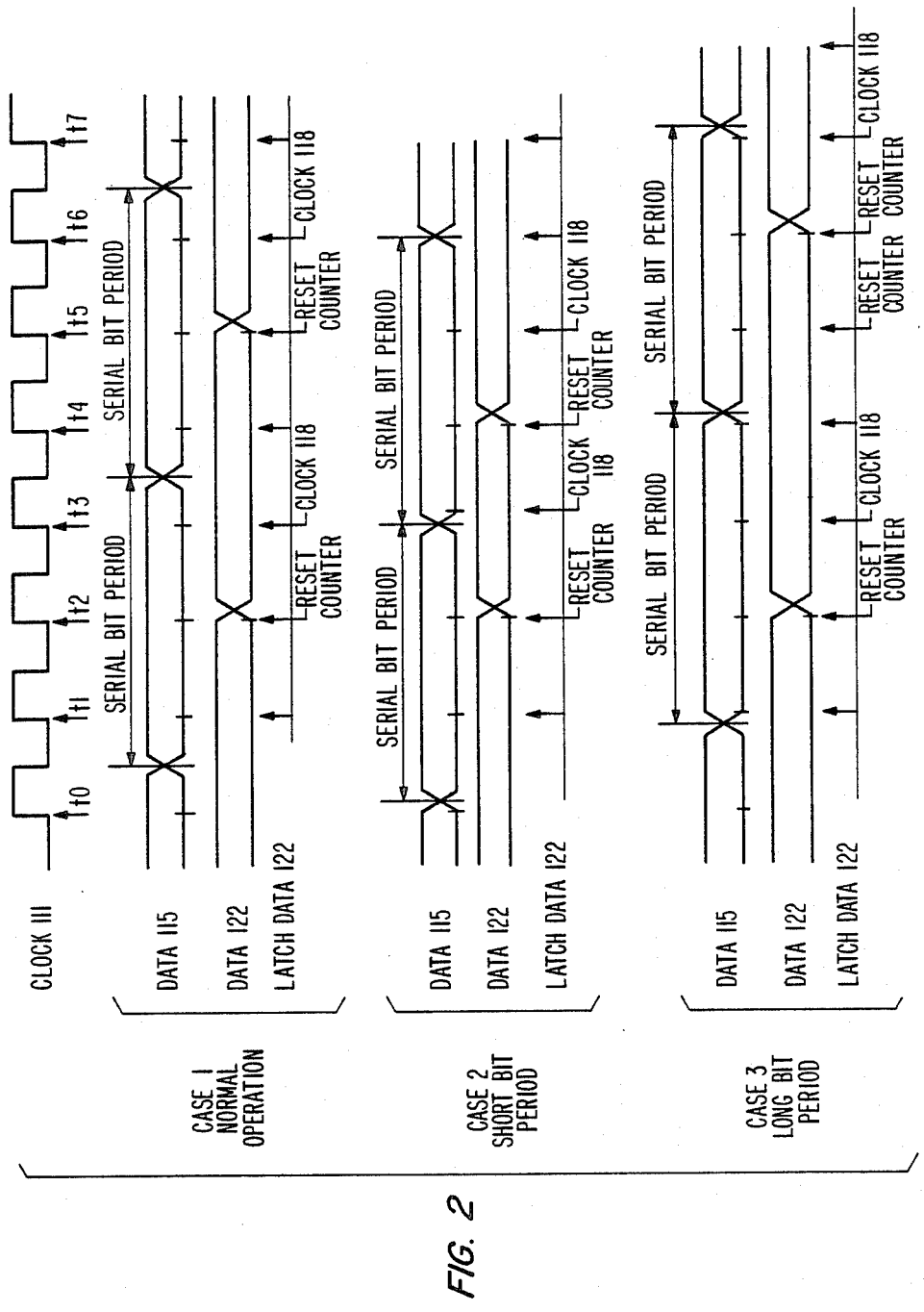

FIG. 2 illustrates the principles of operation of the circuit of FIG. 1. Hexagrams represent data bits which may be either a binary "1" or a binary "0". Transitions are assumed to occur only where the hexagrams meet. Three examples termed case 1, 2 and 3 are shown on FIG. 2. Case 1 is first described. A leading edge transition of the incoming signal on path 115 occurs between time t0 and t1. A sample of the received data on line 115 is clocked into latch 101 at the beginning of each clock pulse on line 111.

The leading edge transition of line 115 is detected where indicated between times t0 and t1. A reset pulse on path 113 is generated at a time t1 to reset the counter 130 at time t2. A derived clock pulse is generated at time t3 when the counter advances from position 00 to its position 01. The derived clock pulse is applied over path 118 to utilization circuit 140 which registers the data samples appearing on path 122 at time t3.

Assuming the next bit received represents a transition that occurs between time t3 and t4, a reset pulse on line 113 is generated at time t4, the counter is reset at time t5, and a derived clock pulse on line 118 is generated at time t6. If the next bit after time t3 is not a transition, the reset pulse on line 113 is not generated at time t4. But the derived clock pulse is still generated at time t6 so the utilization circuit can register the data sample then on line 122. The derived clock is still generated since the counter advances through its positions 00, 01, 03, 00, 01 --- in response to local clock pulses on line 111 when no data is being received and therefore no reset pulses are generated by detector 100.

Case 2 is the same as case 1 except that the received bit intervals are shifted to the left in time and are shorter.

Case 3 is the same as case 1 except that the leftmost bit period is somewhat longer and includes four local clock samples rather than three. The counter is driven to its position 00 at time t5 by the local clock 110. Assuming the next bit period represents a transition, the counter is again set to its position 00 by the reset pulse at time t6.

DETAILED DESCRIPTION

Transition detector 100 comprises data restoration latch 101, delay latch 102, exclusive OR gate 105 and local clock 110 which applies a signal to line 111 that is nominally three times the expected incoming data rate. Counter 130 produces a recovered clock signal on line 118. The counter comprises latches 103 and 104, AND gates 106 and 108, and NOR gates 107 and 109. The counter is synchronized to the incoming data by the reset signal generated on path 113 by gate 105 each time a signal transition is detected on line 115.

Data Restoration Latch

Data appears in the form of pulses on line 115 at the input of data latch 101. A positive or high data pulse is here assumed for purposes of description. A high data pulse is clocked through data latch 101 by the leading edge of a clock pulse on line 111. There are nominally three such clock edges for each bit on line 115. Therefore, the timing change to the restored edge at line 112 does not exceed one third of the period of the incoming data bit on line 115. After the trailing edge of the incoming bit on line 115, the level of the data at data line 115 goes low. This low is clocked through data latch 101 to path 112 to complete the restoration of the incoming data bit.

Delay Latch

As a high value on line 115 is clocked through latch 101 to line 112 for the first time, the prior low value of line 112 is clocked through latch 102 to line 122. The resulting high value of line 112 is clocked through delay latch 102 as the next leading edge appears on line 111. After the level on data line 115 goes low at the end of a positive data pulse, the low is clocked through latch 101 and simultaneously, the current high on line 112 is clocked through latch 102. The new low at line 112 is clocked through data latch 102 by the next leading edge pulse on line 111. In this way, any change of level on line 112 is delayed by the period of one clock signal before a corresponding change of level is applied to line 122.

Counter Reset Circuit

The counter reset circuit comprises exclusive OR gate 105. The inputs to gate 105 are the restored data on line 112 and the delayed restored data line 122. The gate 105 generates one reset pulse on line 113 for each change of level of the data on line 112. Each such change of level represents a transition of the input signal on line 115.

For the period between the time the level on line 112 changes and the time the level on line 122 changes one clock pulse later, the two inputs to exclusive OR gate 105 differ and its output goes high on line 113. When the level on line 122 subsequently changes to match that on line 112 on the next clock pulse, the output of exclusive OR gate 105 goes low. The level on lines 113 goes high again between the time the trailing edge of the restored signal appears on line 112 and the time it appears on line 122. Thus, a pulse on line 112 produces one reset pulse on line 113 on both its leading and trailing edges. In this fully synchronous design, both the leading and trailing edges of reset pulses at line 113 occur at predictable times.

Clock Recovery Counter

The clock recovery counter comprises gates 106 through 109 and latches 103 and 104. It produces a recovered clock pulse on line 118 for each data bit applied to line 122. It also produces a clock pulse on line 118 when counter 130 advances from its position 00 to 01 under control of local clock signals on line 111 even though no data is then applied to path 115. The counter responds to two signals. These signals are the local clock signal on line 111 and the reset signal on line 113. It is a modulo-3 counter and it divides the frequency of the timing signal on line 111 by three. The nominal frequency of the line 111 signal is three times that of the clock signal on line 115. This makes the frequency of the counter output on line 118 nominally equal that of the expected clock embedded in the data on line 115. The counter is reset to its position 00 by the reset pulses on line 113 when data is received. On the absence of incoming data, it is driven to its reset position 00 by the pulses on line 111.

Since the local clock signal on line 111 is nominally three times the expected incoming data rate and since the counter divides the local clock signal 111 by three, the counter nominally produces one derived clock pulse on line 118 for each possible data bit on line 122. The Q terminals of latches 103 and 104 carry, respectively, the least and most significant bits of the two-bit modulo-3 counter. A 00, 01, 11 (0-1-3) sequence of counts appears on lines 123 and 118.

Reset line 113 is connected to the counter at inputs of NOR gates 107 and 109. When the reset signal on line 113 goes high, the D inputs of latches 103 and 104 are driven low by NOR gates 107 and 109. These lows are clocked through latches 103 and 104 by the rising edge of the next local clock pulse on line 111. This makes both output lines 118 and 123 go low to produce a counter output of 00. This sets the counter to zero so it may begin to count again from that starting point.

Example of Circuit Operation

FIG. 3 illustrates various waveforms as the circuit of FIG. 1 responds to incoming data on line 115. The action to be described takes place within 14 of the local clock pulses on timing line 111. The situation illustrated in FIG. 3 is one in which considerable time has passed since data last appeared on data line 115. The resultant difference in timing between the leading edges of data on line 115 and the leading edge of the restored clock on line 118 is caused by a lack of synchronization between the clock of the sending system and local clock 110. An offset of this magnitdue will seldom occur since the clock recovery counter is reset as subsequently described by each incoming high datum. The unusual offset is positioned in this description to highlight the process of resetting the clock recovery counter.

If the clock embedded in the incoming data is an exact submultiple the local clock 110, the clock recovery counter 130 is reset by a signal on lead 113 at a time when it would set itself to zero in the normal course of counting clock pulses on line 111. In FIG. 3, the incoming data bit on line 115 is not synchronized to the recovered clock signal on line 118 because no data has been received for a while until the bit is received that begins after time t6. In this example, a foreshortened recovered clock signal 118 begins at time t7 and the leading edge of the datum 115 occurs just before time t7. At time t7, the transition detector 100 has not yet responded to the leading edge incoming signal transition 115. Among the actions subsequently described, therefore, is the action of the circuit in adjusting itself to be synchronized with data on line 115. Thus, by the time this datum ends after time t9, the recovered clock signal on line 118 is synchronized.

In response to the leading transition on line 115, gate 105 generates a reset pulse 113 at time t7. This pulse resets the counter at time t8 and synchronizes it with the incoming data. Likewise, the trailing signal transition on line 115 after time t9, generates a reset pulse on line 113 at time t10 that resets the counter at time t11 which is the same time the pulses on line 111 would set the counter to its position 00.

Recall that the purpose of clock recovery counter 130 is to provide a recurring synchronizing pulse on line 118 so the clock recovery circuit of FIG. 1 may, by reference to the synchronizing pulses, perform its operation on the datum on line 122 at a time when the datum is most stable. Recall too that the circuit of this invention both restores any incoming datum for the use of circuit 140 and also recovers a synchronizing pulse for its use. As the clock pulse is recovered by the circuit of the invention, the restored datum is produced on line 122. This restored datum is delayed with respect to the incoming datum on line 115 and the delay is such that the recovered clock pulse on line 118 occurs after the restored datum on line 115 has stablized. For example, in FIG. 3 a restored datum on line 122 is shown to span times t8 to t11. The leading edge of the recovered clock pulse on line 118 occurs at time t9. This is well after the restored datum on line 122 has had time to stabilize.

Data Restoration: Leading Edge

From time 1 through time 6 of FIGS. 3 and 4, the counter 130 cycles twice and produces positive going leading edge signals on line 118 at times t1 and t4 in response to the six local clock pulses on line 111 that occur during that time period. The positive going signals on line 118 during this time are applied as synchronizing derived clock signals to utilization circuit 140 to keep it in synchronization when no data is received on line 115. The leading edge on line 118 at time t7 is generated in the same way as at times t1 and t4.

The following describes the operation of the counter latches 103 and 104 of FIG. 1. This description is referenced to times t1 through t6 of FIG. 4. It is assumed that no data is received during this time interval so that reset lead 113 remains low. The action described occurs solely as a result of the successive clock pulses applied to lead 111.

Figure 5:
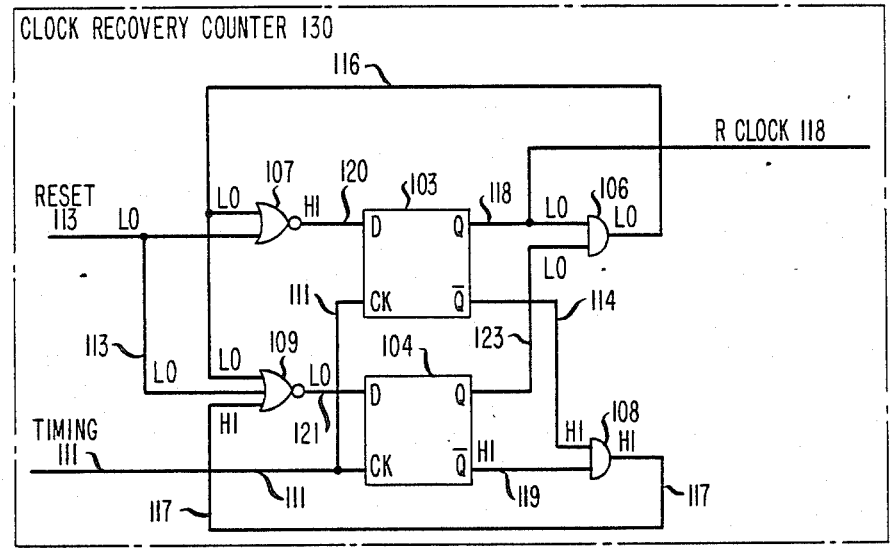
FIGS. 5 through 8 illustrate the pertinent circuit changes of state of my counter as it advances through its various operative states in response to the receipt of local clock pulses.

The state of the circuit prior to time 1 is shown on FIG. 5 and is as follows. Both inputs to gate 107 are low to produce a high on its output which extends to the input of latch 103. The top two inputs to gate 109 are low and the bottom input is high. This high causes a low at the output of gate 109 which extends the input of latch 104. The counter output leads 118 and 123 are both low. The counter is in its 00 counting position at this time.

Figure 6:
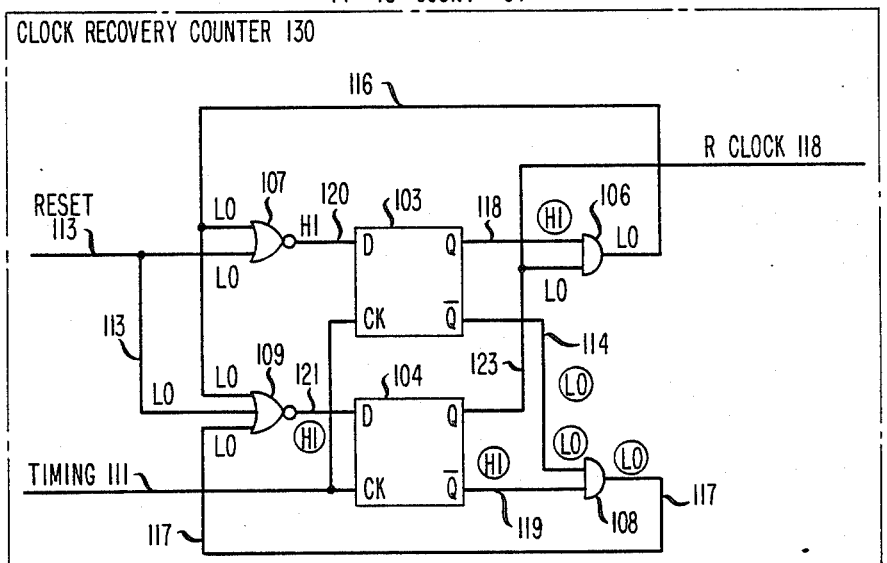

At time t1, the leading edge of the clock signal on line 111 clocks the high on the D input of latch 103 through the latch to its Q output. The same clock pulse clocks the low on the D input of latch 104 through the latch to its Q output. The state of the circuit at this time is shown on FIG. 6 where polarity changes are shown within circles. The signal on line 114 goes low when the high is clocked through latch 103 to its Q output. The signal on line 118 goes high at this time. The low on line 114 extends to gate 108 and causes the output of gate 108 on line 117 to go low. The low on line 117 extends to the lower input of gate 109 to drive its output high since its other two inputs are already low. Thus, at this time, the output of gate 109 switches from a low to a high. The output of gate 107 remains high. We are now awaiting the receipt of the next leading edge clock signal at time t2. The counter is now in its position 01.

Figure 7:
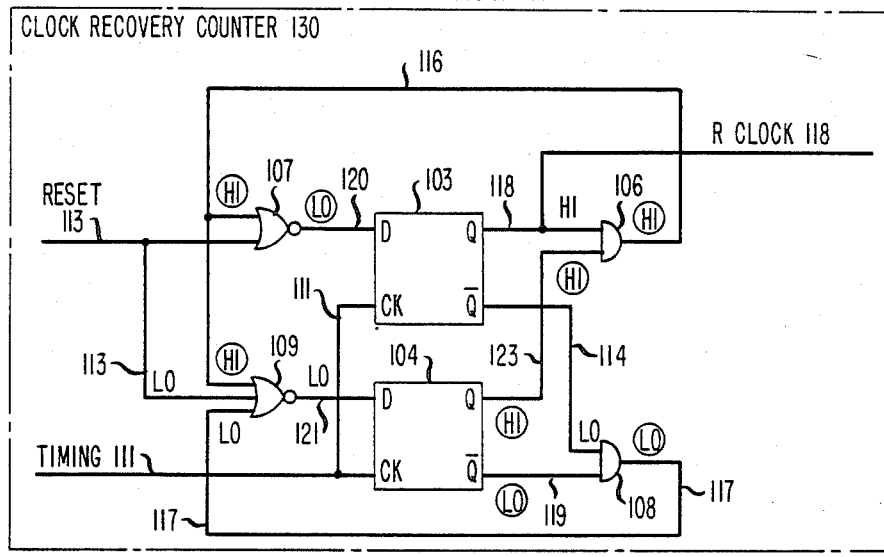

The leading edge clock signal on line 111 appears at time t2 and the following circuit actions take place. The state of the circuit is shown on FIG. 7. The high on the D input of both latches 103 and 104 is clocked through the latches to their Q outputs. The Q output of latch 104 at this time changes from a low to a high. The Q output of latch 103 was a high before and therefore does not change. The high on line 123 combines with a high on line 118 into gate 106 to produce a high on its output. This output is lead 116 and the high on lead 116 is applied to the input of gate 107. This high drives the output of gate 120 low on lead 120 which extends to the D input of latch 103. The not Q output of latch 104 switches to a low at this time. This low extends to the lower input of and gate 108. No change occurs at the output of the gate since its upper input was already low.

At this time the Q output of both latches is high so that the position of the counter is a binary 11. A binary 11 equals a count of 3 and the next state of the counter will be its 00 state. The circuit reamins in the above described 11 state during the interval from time t2 but prior to the arrival of a clock pulse at t3.

Figure 8:
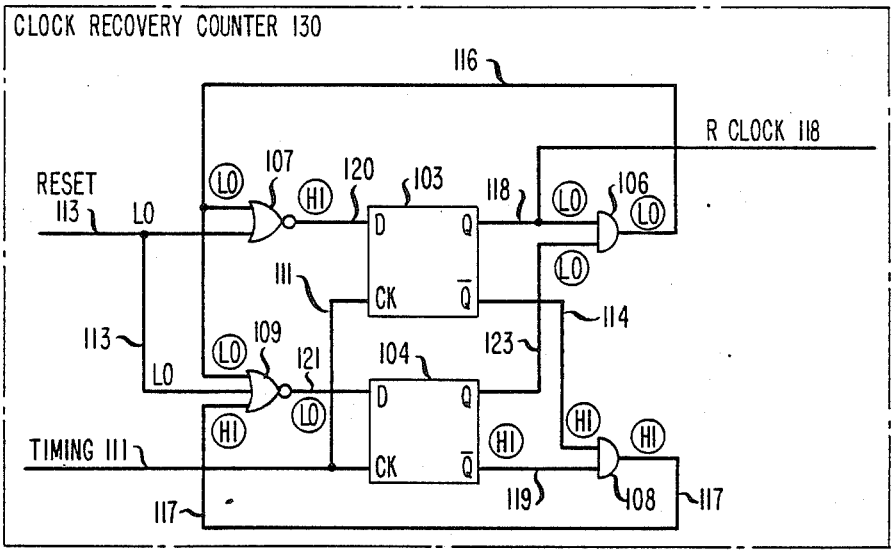

A clock pulse arrives on lead 111 at time t3 and causes the following circuit changes shown on FIG. 8. The low (FIG. 7) on the D input of latch 103 and the low (FIG. 7) on the D input of latch 104 are clocked through these latches to their Q outputs by the leading edge of the clock pulse at time t3. After the latching action at time t3, the Q output of latch 103 is a low and the Q output of latch 104 is a low. The not Q outputs of both latches are high. Under these conditions, both inputs to gate 106 are low to produce a low at its output which extends over path 116 to the upper input of gate 107. This drives its output high extending to the D input of latch 103. Further, both inputs of gate 108 are high to produce a high at its output which extends over lead 117 to the lower input of gate 109. This high drives the output of the gate low which extends to the D input of latch 104.

The counter is in its position 00 and the state of the circuit at this time, namely between times t3 and t4, is exactly the same as was the state of the circuit immediately before time t1. The circuit subsequently responds to leading edge clock pulses at times t4, 5 and 6 and responds in a manner that is identical to the response of the circuit to the clock pulses at times t1, 2 and 3.

A high data bit is shown to appear on line 115 on FIG. 3 just before time t7. This high data bit is clocked through latch 101 to line 112 at time 7 as shown on FIG. 3. The high signal on line 112 is termed the restored data signal. The signal on line 112 is synchronized to the local clock on line 111 since the signal on line 111 clocks the data on line 115 through latch 101.

Synchronized Division

The function of counter 130 is to generate a positive going recovered clock signal on line 118 at a time when the data signal on line 122 is stable.

At time t7, the signal at line 112 goes high, as already described, but this high signal has not yet been clocked through data latch 102. Thus, the signal on line 112 is high and the signal on line 122 is low between times t7 and t8. Exclusive OR gate 105 applies a high reset signal to line 113 whenever its inputs differ. A high reset signal is therefore generated by gate 105 on line 113 between times t7 and t8. This high is applied to the inputs of OR gates 107 and 109 to produce a low on the outputs of the gates on lines 120 and 121. This low is applied to the D inputs of both latches 103 and 104 between times t7 and t8.

These low signals applied to the D input of latches 103 and 104 interrupt the counting sequence at time t8 as follows. The low signals are clocked through latches 103 and 104 to their Q outputs at time t8. This makes lines 118 and 123 low to reset the counter to its position 00. The counter then begins to count from its position 00 at time t8 under control of the local clock signal on line 111. Thus, a reset signal is generated on line 113 to reset counter 130 in response to the receipt of data on line 115. This reset signal synchronizes counter 130 so that derived clock pulses are generated at the proper time on line 118 in synchronism with the incoming data on line 115.

At time t8 the high at line 112 is clocked through latch 102 to cause a high on line 122 as shown on FIG. 3. The signal on line 118 remains low between times 8 and 9. The signals on both lines 112 and 122 are high during times t8 through t10 because of the high on line 115. The inputs to exclusive OR gate 105 match during these times. This causes gate 105 to apply a low to line 113 beginning at time t8 because of its matching input signals. This low on line 113 permits the counter to begin counting at time t8 from its position 00 under control of the local clock signal on line 111. The counter advances from its position 00 to 01 upon the rising edge of the signal on line 111 at time t9. Gate 107 then applies a high to the D input of latch 103. This high is clocked through the latch by the rising edge of signal 111 at time t9. The level on line 118 goes high at time t9. Thus, a rising edge derived clock signal on line 118 is generated as a result of an input signal transition on line 115 between times t6 and t7, the resetting of the counter and its advancement from its position 00 to 01.

Data Recovery: Trailing Edge

The signal on line 115 ends before time t10 and the resulting low on line 115 is clocked through data latch 101 by the signal on line 111 at time t10 to produce a low on line 112. The signals on line 122 and 112 differ at time t10. A reset signal is therefore generated at time t10 by exclusive OR gate 105 on line 113. Since the counter counts at three times the rate of the incoming data, the counter is now at a count of three (binary 11) at time t10. There is therefore no interruption of the count when the counter is reset to zero at time t11 by highs on either or both of leads 113 or 116. The counter is reset to position 00 at time t11 as it was at time t8 when the low going pulse on lines 120 and 121 was clocked through latches 103 and 104 by a high going pulse on line 111.

The counting of the local clock pulses on line 111 continues normally through time t14. This produces properly timed recovered clock pulses on line 118 when the counter advances from its position 00 to position 01 at time t12. The operation of the counter by the local clock 111 persists until the next data signal arrives on line 115 to repeat the resetting process described above. The recovered clock signals on line 118 and the data signals on line 122 are both applied to data utilization circuit 140. The timing of these signals is such that clock signals on line 118 occur when the line 122 data signal is stable. This ensures that circuit 140 will always register good data.

What is claimed is:

1. A circuit for deriving the clock of an incoming data signal, said circuit comprising:
   a local clock source for generating local clock pulses having a nominal rate of 3 times the expected clock rate of said incoming signal,
   an input on said detector for receiving said incoming signal,
   means within said detector for delaying said received incoming signal by storing said received incoming signal in response to said received incoming signal and said local clock pulses and for producing a first delayed signal on a first output of said detector a second delayed signal,
   means in said detector responsive to each transition of said delayed signal and said second delayed signal for generating a counter reset pulse on a second output of said detector,
   first and second counter latches having inputs and outputs,
   gating means interconnecting inputs and outputs of said counter latches for operating said counter latches as a modulo-3 counter in response to said local clock pulses, said first and second counter latches and said gating means responsive to said local clock pulses for cyclically advancing through three counting positions, said first and second counter latches and said gating means responsive to the generated counter reset pulse received from said second output terminal of said detector for resetting said counter to its first counting position, said first latch further responsive for generating a derived clock pulse each time said counter advances to its third counting position, a utilization circuit, said means within said detector for delaying in response to said received incoming signal and said local clock pulses for transmitting said delayed signal from the first output of said detector to a first input of said utilization circuit, and said first latch in response to each time said counter advances to its third counting position for transmitting each derived clock pulse to a second input of said utilization circuit whereby said utilization circuit registers the delayed signal extant on the first input of said utilization circuit at the time said derived clock pulse is applied to the second input of said utilization circuit.

2. A method of deriving the clock of an incoming data signal, said method comprising the steps of:
(1) generating local clock pulses having a nominal rate of 3 times the expected clock rate of said incoming data signal,
(2) applying said incoming data signal to an input of a transition detector,
(3) delaying said data signal within said detector and producing the delayed signal on a first output of said detector,
(4) generating a reset pulse on a second output of said detector in response to each transition of said delayed data signal,
(5) advancing a modulo-3 counter cyclically through its counting positions in response to the generation of said local clock pulses,
(6) resetting said counter to its first counting position in response to the generation of each reset pulse,
(7) generating a derived clock pulse on an output of said counter each time it advances to its ith counting position where i is less than 3,
(8) applying said delayed data signal from the first output of said detector to a first input of a utilization circuit, and
(9) applying each derived clock pulse to a second input of said utilization circuit whereby said utilization circuit registers the delayed data signal extant on its first input at the time said derived clock pulse is applied to its second input.

* * * * *